UNITED STATES PATENT OFFICE.

BERTHOLD WUTH AND CARL JAGERSPACHER, OF BASEL, SWITZERLAND, ASSIGNORS TO SOCIETY OF CHEMICAL INDUSTRY IN BASLE, OF BASEL, SWITZERLAND.

COPPER COMPOUNDS OF ORTHOOXYAZO DYESTUFFS AND A PROCESS OF MAKING SAME.

1,234,994.      Specification of Letters Patent.      Patented July 31, 1917.

No Drawing. Original application filed October 7, 1915, Serial No. 54,504. Divided and this application filed January 24, 1917. Serial No. 144,245.

*To all whom it may concern:*

Be it known that we, BERTHOLD WUTH, chemist, a subject of the King of Great Britain, and CARL JAGERSPACHER, chemist, a citizen of the Swiss Republic, both residents of Basel, Switzerland, have invented new Copper Compounds of Orthooxyazo Dyestuffs and Processes of Making Same, of which the following is a full, clear, and exact specification.

This application is a divisional one of our application for Letters Patent Ser. No. 54504, filed October 7, 1915.

In the United States application for Letters Patent, Ser. No. 43413, filed August 3, 1915, is described the production of new well defined copper compounds of orthooxy dyestuffs, which are soluble in water. We have now found, that the orthooxydiazo dyestuffs derived from orthocarboxylated benzoylacetic acid

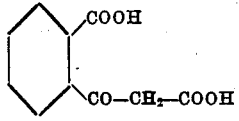

can also be transformed into new copper compounds by their treatment with copper compounds as for instance copper salts, copper oxid or copper hydroxid. The copper compounds soluble in water thus obtained, from which the copper cannot be precipitated by sodium carbonate, soda lye and ammonia, constitute blue to black powders and yield in an acid bath on animal fibers as for instance wool, silk and leather, straw and wood-bast valuable blue to violet tints of good fastness to washing and to light, which are distinguished from the orthooxyazo dyestuffs employed as parent materials by entirely different shades and by a better fastness to washing and to light. The new copper compounds dissolve in concentrated sulfuric acid to deep colored solutions and in water to intense colored solutions which do not change their coloration on addition of sodium carbonate or of soda lye.

The preparation of the heretofore unknown dyestuffs from orthodiazophenol derivates or orthodiazonaphthol derivates and orthocarboxylated benzoylacetic acid takes place in the usual way by combining the orthooxydiazo compounds with the said component in an alkaline solution, as it is illustrated by the following example:

Example: The diazo derivative of 20 parts of sulfoamidosalicylic acid

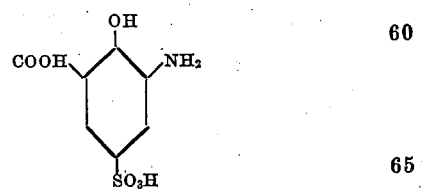

is poured into a concentrated solution of 21 parts orthocarboxylated benzoylacetic acid in water made alkaline by sodium carbonate. The dyestuff separated after combination is isolated by filtration, pressed and dried. It dissolves in water to orange-yellow and in concentrated sulfuric acid to pure violet solutions; by adding copper salts to the aqueous solutions their orange-yellow coloration turns to blue. It dyes wool in an acid bath brown tints.

In order to transform this oxyazo dyestuff into its new copper compound 23 parts of the dyestuff are dissolved in 1000 parts water and to this solution are added at about 70° C. a solution of 13 parts copper sulfate in 50 parts water. The blue copper compound precipitates at once. After neutralization of the free sulfuric acid with sodium carbonate, the new copper compound is separated by filtration, pressed and dried. It dyes wool in an acid bath blue tints fast to washing and to light.

If in the foregoing example the diazo derivative of sulfoamidosalicylic acid is replaced by chloroaminophenol 4-2-1, the sodium salt of the resulting orthooxydiazo dyestuff dyes wool in an acid bath gray brown tints, while the copper compound derived from this orthooxyazo dyestuff dyes wool in an acid bath dark-blue tints.

What we claim is:

1. The described process for the manufacture of new copper compounds of orthooxyazo dyestuffs, soluble in water, consisting in treating the orthooxyazo dyestuffs derived from othocarboxylated benzoylacetic acid with copper compounds in a watery medium.

2. The described process for the manufacture of new copper compounds of orthooxyazo dyestuffs, soluble in water, consisting in treating with copper compounds in a watery medium the orthooxyazo dyestuffs resulting from the combination of aromatic orthooxydiazo bodies with orthocarboxylated benzoylacetic acid.

3. As new products the described copper compounds of orthooxyazo dyestuffs, derived from orthocarboxylated benzoylacetic acid, which are soluble in water, from which the copper cannot be precipitated by sodium carbonate, soda lye and ammonia and which constitute blue to black powders, dissolving in concentrated sulfuric acid to deep colored solutions and in water to intense colored solutions which do not change their coloration on addition of sodium carbonate or soda lye and from which the animal fibers as wool, silk and leather, straw and woodbast are dyed, according to the methods used for acid dyestuffs, blue to violet tints showing without any further treatment a very good fastness to washing and to light.

In witness whereof we have hereunto signed our names this 23rd day of December 1916, in the presence of two subscribing witnesses.

BERTHOLD WUTH.
CARL JAGERSPACHER.

Witnesses:
CARL O. SPAMER,
ARMAND RITTER.